United States Patent
Kim

(10) Patent No.: US 6,930,295 B2
(45) Date of Patent: Aug. 16, 2005

(54) MICROWAVE OVEN WITH TOASTER

(75) Inventor: Hyung Do Kim, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/468,268

(22) PCT Filed: Dec. 17, 2002

(86) PCT No.: PCT/KR02/02373

§ 371 (c)(1),
(2), (4) Date: Aug. 19, 2003

(87) PCT Pub. No.: WO03/051164

PCT Pub. Date: Jun. 26, 2003

(65) Prior Publication Data

US 2004/0074901 A1 Apr. 22, 2004

(30) Foreign Application Priority Data

Dec. 19, 2001 (KR) ................................ 10-2001/0081460

(51) Int. Cl.[7] .............................. H05B 6/80; A47J 37/00
(52) U.S. Cl. ....................... 219/685; 219/680; 219/757; 219/762; 99/392; 99/DIG. 14
(58) Field of Search ................................. 219/685, 680, 219/725, 739, 756, 757, 762, 763, 386, 521, 413; 99/385, 391, 392, 393, 399, 400, 402, 451, DIG. 14

(56) References Cited

U.S. PATENT DOCUMENTS

| | | | |
|---|---|---|---|
| 4,354,084 A | * 10/1982 | Husslein et al. | ............ 219/757 |
| 5,814,793 A | * 9/1998 | Yu | .............................. 219/757 |
| 6,509,556 B2 | * 1/2003 | Kim | ............................ 219/757 |
| 6,539,840 B2 | * 4/2003 | Choi et al. | ..................... 99/331 |

FOREIGN PATENT DOCUMENTS

| | | | |
|---|---|---|---|
| EP | 1 213 948 A2 | 6/2002 | |
| JP | 1-305231 | * 12/1989 | ................. 219/685 |
| JP | 2004131 | 1/1990 | |
| JP | 3271630 | 12/1991 | |
| JP | 4055622 | 2/1992 | |

OTHER PUBLICATIONS

International Search Report; Feb. 26, 2003; 3 pages; Australian Patent Office.

* cited by examiner

Primary Examiner—Philip H. Leung
(74) Attorney, Agent, or Firm—McKenna Long & Aldridge LLP

(57) ABSTRACT

A microwave oven with a bread toaster is provided. The microwave oven with the bread toaster includes a cavity for cooking an object, an electrical device chamber having electrical devices for heating the object within the cavity, a ventilating device and a toaster. The ventilating device exhausts air inside the cavity to outside the microwave oven. The ventilating device also cools the electrical devices. The toaster, which is adjacent to the cavity, includes a toaster case and a toaster entrance. The object, such as a slice of bread, enters into and exits from the toaster case by opening or closing the toaster entrance.

68 Claims, 5 Drawing Sheets

MICROWAVE OVEN WITH TOASTER

This application claims the benefit of Korean Application No. P 2001-0081460 filed on Dec. 19, 2001 which is hereby incorporated by reference for all purposes as if full set forth herein.

BACKGROUND OF THE INVENTION

1. Field of the Invention

The present invention relates to a microwave oven with a bread toaster, and more particularly, to a structure of a microwave oven with a bread toaster, in which each slice of bread enters into or exits from an inside of the bread toaster.

2. Background of the Related Art

In general, an ordinary microwave oven, which is illustrated in FIG. 1, is an apparatus that applies microwave-heat to an object. Referring to FIG. 1, the microwave oven includes a cavity 2 which is provided inside a cavity assembly 1, in which an object is microwave-heated. The cavity 2 is opened and closed by a cavity door 4. The microwave oven also includes an electrical device chamber 10 having various electrical devices for generating microwave heat. The electrical device chamber 10 is provided next to the cavity 2 and is covered with an outer case 6. The electrical devices include a magnetron 12 which generates microwaves, a high-voltage transformer 14 which supplies high voltage to the magnetron 12, and a ventilating fan 16 which cools the electrical devices after heating by generating an air flow inside the cavity 2.

Since the ordinary microwave oven shown in FIG. 1 heats an object by using microwaves, it is not proper to use it for toasting slices of bread. Therefore, there are high demands for microwave ovens that are able to cook or heat food by using microwaves and also toast the slices of bread. In a microwave oven having toasting capabilities, it is important to maximize the toasting performance of the bread toaster. Also, the security and convenience of a user have to be obtained so as to improve the quality of the bread toaster.

SUMMARY OF THE INVENTION

Accordingly, the present invention is directed to a microwave oven with a bread toaster that substantially obviates one or more problems due to limitations and disadvantages of the related art.

An advantage of the present invention is to provide a microwave oven with a bread toaster, in which each slice of bread is easily drawn out from an inside of the bread toaster after toasting.

To achieve these and other advantages in accordance with an embodiment of the invention, as embodied and broadly described herein, a microwave oven with a bread toaster includes a cavity for cooking an object; an electrical device chamber having various electrical devices for heating said object within said cavity; a ventilating device for both exhausting an air inside said cavity to an outside of said microwave oven and cooling said electrical devices; and a toaster provided adjacent to said cavity, in which a slice of bread enters into and exits from an inside of the toaster case by opening or closing a toaster entrance.

Said electrical device chamber is in an upper part of said microwave oven, and said ventilating device may also bein an upper part of said microwave oven.

Said ventilating device may include a grill having a plurality of suction holes on a front surface of said microwave oven, and a fan assembly connected with an outside of the microwave oven at a backside of said microwave oven, the fan assembly having a fan which ventilates air inside said cavity and a motor which drives said fan.

Said electrical device chamber may be connected with said ventilating device.

Said toaster includes a toaster door which closes or opens said toaster entrance in a line with a cavity door. The toaster also has a tray connected to said toaster door by a link mechanism, which moves outwardly or inwardly according to either the opening or the closing of said toaster door.

Said toaster door may rotate about an axis at the bottom of said toaster door, said bread slice is vertically placed on said tray, and said tray further may include a flange provided at the rear of said tray which supports the backside of the bread slice.

Said link mechanism may include a tray support having said tray at an upper part where the tray support reciprocates within a toaster body, and a connecting lever connecting said door to said tray support.

In said link mechanism, said tray support may move along slots provided at both sidewalls of said toaster body, and said slots extend at the bottom of both sidewalls of said toaster body in parallel with said sidewalls.

Said tray support may include a bushing fastened to the both sides of said tray support that guides a reciprocating movement when inserted to said slot.

Said connecting lever may include a first end hingedly connected with said bushing and a second end hingedly connected with said toaster door.

Said link mechanism may include an elastic member which connects said connecting lever to said toaster body thereby supporting said toaster door to be closed.

Said elastic member may connect one end of said connecting lever connected to said toaster tray with a rear end of the toaster body.

Accordingly, it is possible to provide a toaster within a microwave oven without increasing a size of the microwave oven and to easily draw out the bread slice from the toaster case, thereby improving both convenience for a user and reliability of the product.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1:
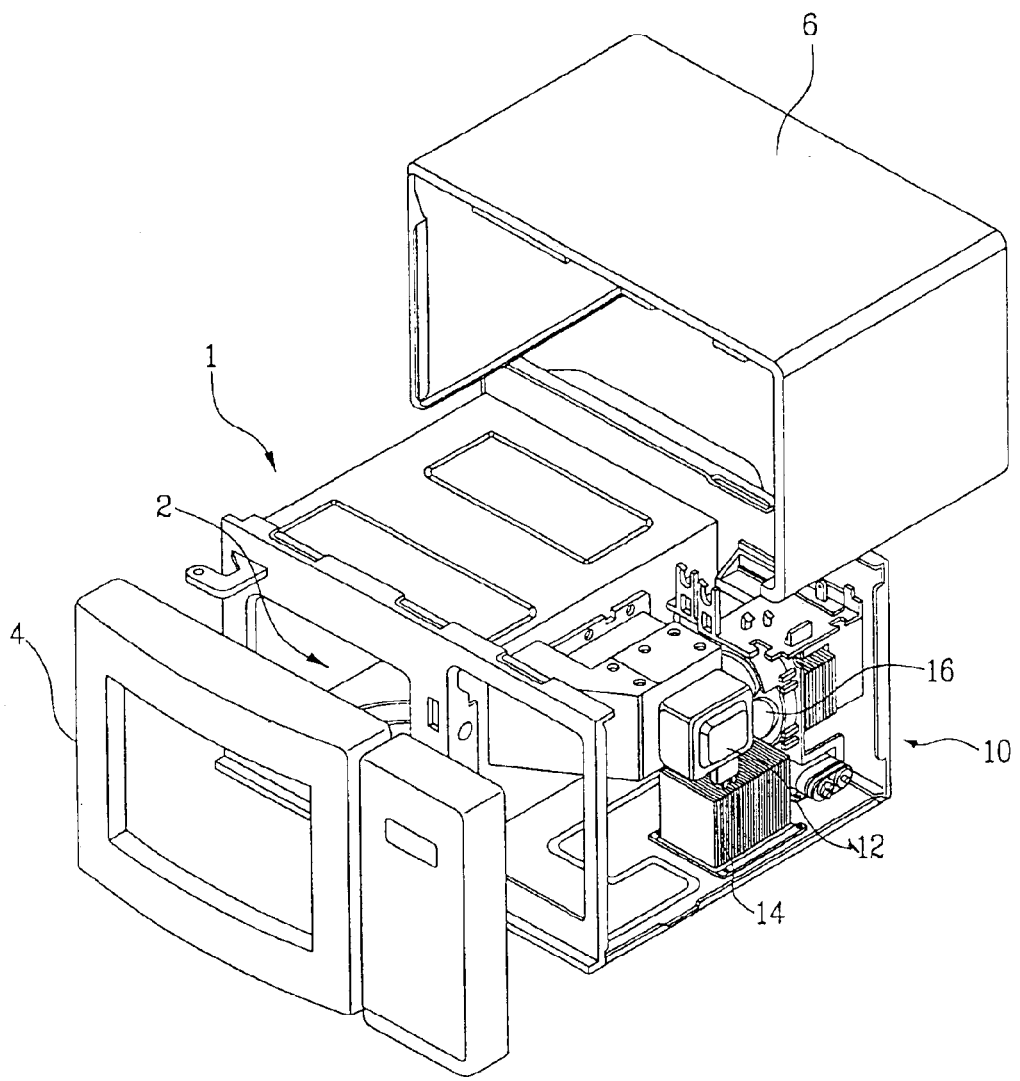
FIG. 1 illustrates an exploded perspective view of an ordinary microwave oven.
Figure 2:
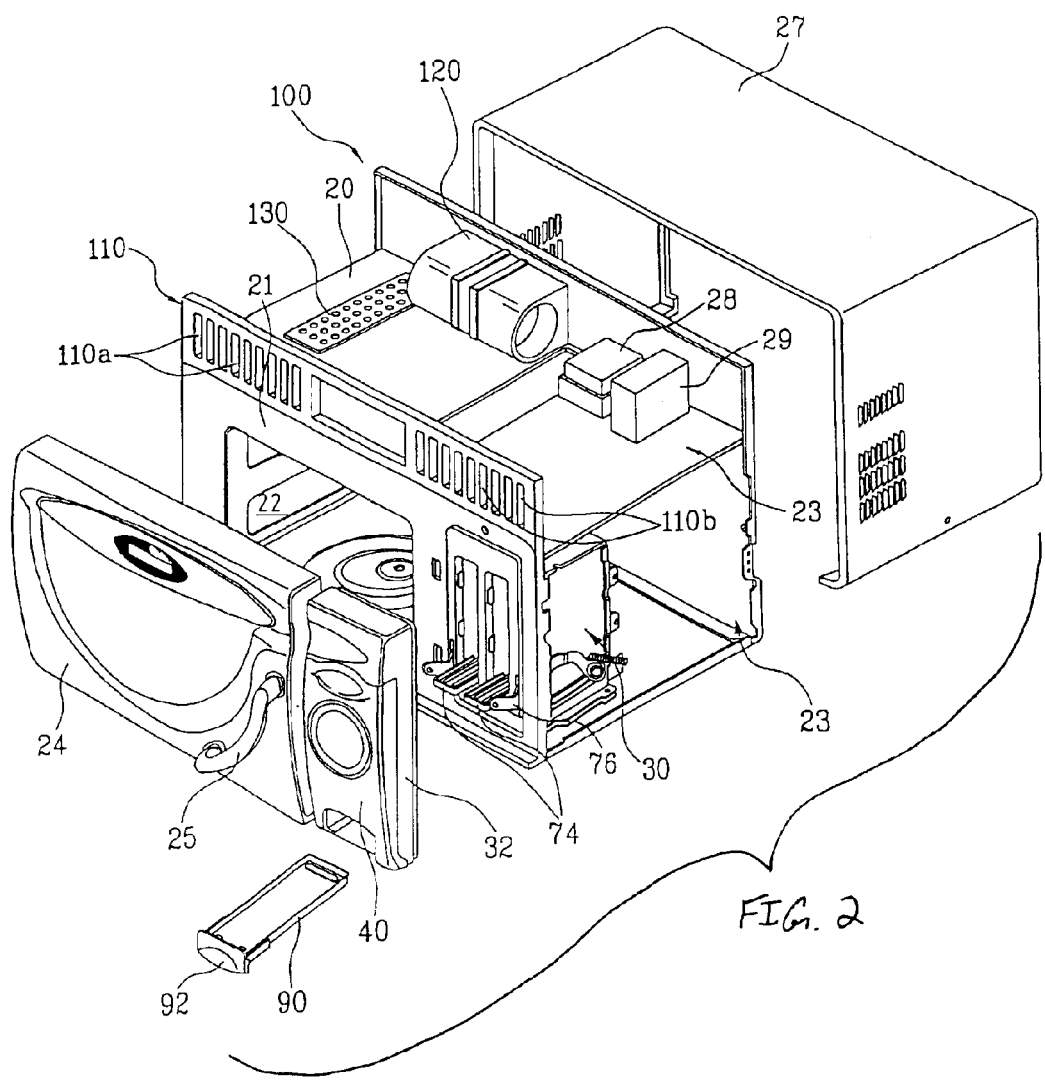
FIG. 2 illustrates a perspective view of a microwave oven with a bread toaster according to the present invention.

FIG. 2 illustrates an exploded perspective view of a microwave oven with a toaster according to the present invention. A cavity 22 is provided within a cavity assembly 20 and an object such as food can be heated in the cavity 22 by microwaves. The microwave oven also includes an electrical device chamber 23 having various electrical devices for generating the microwaves, a toaster 30 and a ventilating device 100 adjacent to the cavity 22. The microwave oven shown in FIG. 2 also includes a front plate 21.

The cavity 22 is opened or closed by a cavity door 24. When the cavity door 24 is closed, the cavity door contacts the front plate 21 thereby covering one side of the cavity 22. The cavity door 24 includes a door handle 25 which enables a user to open and close the cavity door 24. The cavity assembly 20, the electrical device chamber 23 and the ventilating device 100 are covered with an outer case 27 that forms top and side exterior surfaces of the microwave oven.

The aforementioned microwave oven according to the present invention will be explained in detail.

The electrical device chamber 23 is in an upper part of the microwave oven on the cavity 22. A bottom surface of the electrical device chamber 23 is positioned at approximately the same height as a top surface of the cavity 22 thereby allowing space to arrange the toaster 30 adjacent to a side of the cavity 22. The electrical device chamber 23 includes a magnetron 28 for generating microwaves and a high-voltage transformer 29 for supplying a high voltage to the magnetron 28.

The ventilating device 100 exhausts gases in the cavity 22 by heating or cooking the object. Also, the ventilating device 100 cools the magnetron 28 and the high-voltage transformer 26 with an air flow generated as the ventilating device 100 exhausts gases from the cavity 22. Thus, the ventilating device 100 connects with the electrical device chamber 23. The ventilating device 100 may be in the upper part of the microwave oven. As shown in drawings, the ventilating device 100 is substantially provided on the cavity 22 and connects with the electrical device chamber 23.

The ventilating device 100 largely comprises a grill 110 and a fan assembly 120. The grill 110 is on a front surface of the microwave oven and may be extended from the front plate 21. The grill 110 includes a plurality of first suction holes 110a for sucking an external air into an inside of the microwave oven. The ventilating device 100 also includes a plurality of supplementary suction holes 130 on a top surface of the cavity 22. Therefore, the cavity 22 connects with the outside and the ventilating device 100 so as to exhaust the cavity of gases through the first suction holes 110a and the supplementary suction holes 130.

Moreover, the grill 110 may be extended to a front side of the electrical device chamber 23 arranged in parallel with the ventilating device 100. When the grill 110 is extended, a plurality of second suction holes 110b may be provided on the extended portion of the grill 110. Accordingly, the electrical device chamber 23 connects with the outside of the microwave oven as well as with the ventilating device 100, thereby cooling various electrical devices from the air flow by the ventilating device 100. The fan assembly 120 is provided at a backside of the microwave oven, and is connected to the outside of the microwave oven by discharge holes (not shown). The fan assembly 120 includes a fan and a motor for driving the fan such that the fan assembly 120 generates air flow inside the microwave oven at a predetermined direction.

When the ventilating device 100 has the aforementioned structure, as the fan assembly 120 is driven, external air moves into the ventilating device 100 inside the microwave oven through the grill 110 by a suction force. As air passing through the first suction holes 110a moves into the fan assembly 120, air within the cavity 22 moves into the ventilating device 100 through the supplementary suction holes 130. After air moves into the fan assembly 120 and the ventilating device 100, the air flow from the first suction holes 110a mixes with the air flow from the supplementary suction holes 130 and the mixed air discharges outside the microwave oven through the fan assembly 120. The air inside the cavity 22 smoothly discharges outside the microwave oven by the air flow through the first suction holes 110a. Meanwhile, air passing through the second suction holes 110b moves into the electrical device chamber 23 and discharges outside the microwave oven through the fan assembly 120 of the ventilating device 100. The air flow through the second suction holes 110b cools both the magnetron 28 and the high-voltage transformer 29 of the electrical device chamber 23.

The toaster 30 is in vacant space under the electrical device chamber 23. As such, the toaster 30 is adjacent to the side of the cavity 22, in a line with the cavity 22 and convenient for a user. The toaster 30 also penetrates the front plate 21. The microwave oven also includes a toaster panel 32 at a front of the toaster 30. An exterior surface of the toaster panel 32 uses the same material as the cavity door 24. Accordingly, the toaster panel 32 forms a smooth front surface with the cavity door 24.

Figure 3:
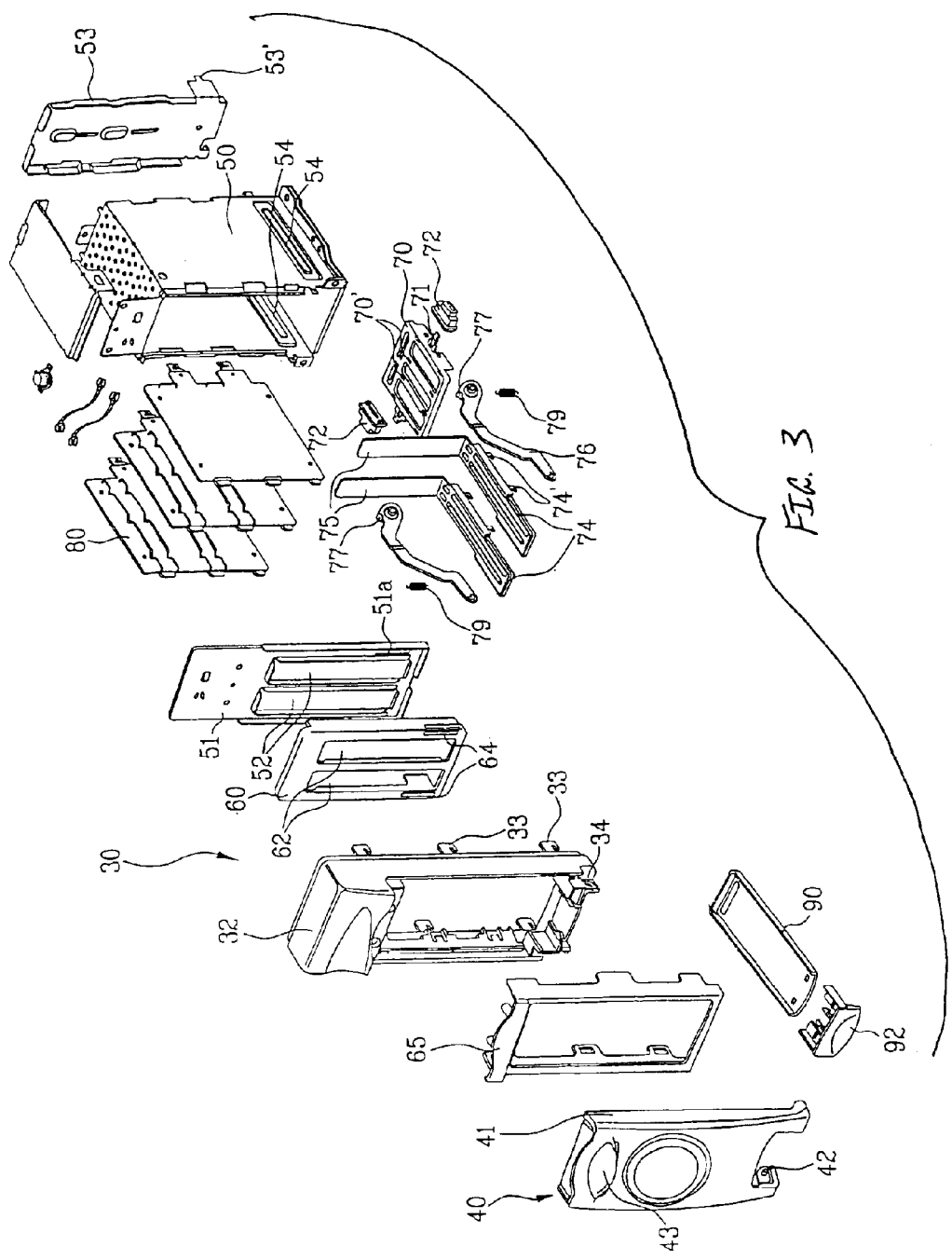
FIG. 3 illustrates an exploded perspective view of a bread toaster included in the microwave oven shown in FIG. 2 in accordance with an embodiment of the present invention.

Reference to the toaster 30 according to the present invention will now be made in more detail. FIG. 3 illustrates an exploded perspective view of the toaster 30 of the microwave oven shown in FIG. 2. The toaster 30 includes fastening hooks 33 at the back of the toaster panel 32 that allow fastening of the panel 32 to the front plate 21 of the microwave oven shown in FIG. 2.

The toaster 30 includes a toaster door 40 hingedly attached to the toaster panel 32. The toaster panel 32 has hinge holes 34 and the toaster door 40 has hinge pins 42 that allow hinged attachment between the toaster door 40 and the toaster panel 32. The toaster door 40 rotates about an axis formed by the hinge pins 42 for opening and closing. The toaster door 40 rotates about the axis provided by the hinge pins 42 at the bottom of the toaster door 40. The toaster 30 also includes a door panel 41 having an exterior surface material the same as the toaster panel 32. Therefore, the door panel 41 forms a smooth front surface of the microwave oven with the cavity door 24 and the toaster panel 32. The hinge pins 42 are at the bottom of the door panel 41 and enable rotational opening and closing of the toaster door 40. The door panel 41 further includes a toaster door handle 43, which allows easy opening and closing of the toaster door 40 by a user.

The toaster 30 further includes a toaster case 50 at the back of the toaster panel 32. The toaster case 50 combines with the toaster panel 32 through a part of the front plate 21 that corresponds to the front side of the electrical device chamber 23. The toaster case 50 is made of a metal material and provides a space for toasting an object, such as a slice of bread.

A case front plate 51 is at the front of the toaster case 50. The case front plate 51 includes two case entrances 52 through which each bread slice enters into or exits from inside the toaster case 50. The toaster case 50 also has a case rear plate 53 at a back thereof.

The toaster 30 also has a toaster front 60 made of a metal material on the case front plate 51 and positioned within the toaster panel 32. The toaster front 60 has two rectangular toaster entrances 62 as shown in FIG. 3 and is exposed when the toaster door 40 is opened. The toaster entrances 62 connect to the case entrances 52 of the case front plate 51. In addition, a protector 65 is provided between the toaster front 60 and the toaster panel 32. The protector 65 is made of an insulating material which blocks heat that flows from the toaster front 60 to the toaster panel 32.

The toaster 30 includes at least one tray 74 positioned within the toaster case 50. The tray 74 supports the bread slice when the bread slice is toasted. It should be noted that a plurality of trays may be formed at need.

The toaster 30 further includes a heaters 80 formed within the toaster case 50 for generating heat which toasts the bread slice. Heat-generating wires are wound in the heaters 80. The heaters 80 are positioned at portions that correspond to both sides of a bread slice thereby providing heat to the bread slice.

The toaster 30 shown in FIG. 3 further may include a crumb holder 90 that is provided at the bottom of the toaster case 50 through the lower part of the toaster panel 32. At the front of the crumb holder 90, a holder handle 92 is provided between the hinge pins 42. A user pulls the holder handle 92 to draw out the crumb holder 90, empties the holder 90, and pushes the holder handle 92 back in order to place the holder 90 inside of the toaster case 50. The surface material of the holder handle 92 is also same as that of the door panel 41.

The aforementioned microwave oven with the bread toaster has the following problems. When the toasting performance is completed, an inner temperature of the toaster 30 is high, such that it is difficult to draw out the toasted bread slice from the toaster. Moreover, if the user draws out the bread slice from the toaster with the their hands, this is very complicated and dangerous due to the narrow toaster entrance and the high temperature inside the toaster.

The tray 74 enters into or exits from the inside of the toaster 30 so as to easily draw out the bread slice. For the convenience of a user, the tray 74 may be configured to move with an operation of the door 40. In this respect, the microwave oven with the bread toaster according to the present invention may include a link mechanism for connectively operating the door 40 with the tray 74. The link mechanism includes a connecting lever 76 which connects the toaster door 40 to a tray support 70 that reciprocates within the toaster case 50 that is a toaster body.

On a flat area of the tray support 70, a plurality of fastening slits 70' are disposed thereon and a plurality of fastening hooks 74' are formed at the bottom of the tray 74. The fastening slits 70' fit to the fastening hooks 74' such that the tray 74 safely fastens to the tray support 70 which allows movement with the tray support 70. Also, the tray has a support flange 75 at a rear end of the movable tray for supporting a backside of the bread slice when the tray 74 moves outward. As such, the support flange 75 stabilizes a bread slice on the tray 74 and prevents falling of the bread slice due to inertia.

The tray support 70 moves along moving slots 54 located on both sides of the toaster case 50. The moving slots 54 are formed at the bottom of the toaster case 50 in parallel to bottom edges of left and right sides of the toaster case 50. The moving slots 54 provide stable reciprocating movement for the tray support 70. The tray support 70 includes connecting parts 71 on left and right sides of the tray support 70. Moreover, the connecting parts 71 have a bushing 72 disposed at an end of the connecting part 71. The connecting parts 71 and the bushings 72 provide connective operation between the moving slots 54 and the tray support 70. Each bushing 72 supports the tray support 70 and moves along the moving slot 54 on each side of the toaster case 50. The shape of each bushing 72 that is actually fitted to the moving slot 54 minimizes rotation of the bushing 72 and the tray support 70 as the bushing 72 and the tray support 70 move along the moving slot 54. Accordingly, a slot-inserting portion of each bushing 72 may have a hexahedron-shape having a same width and length as that of the moving slot 54 such that the trays 74 always move in parallel to the moving slots 54.

Also, the tray support 70 has substantially the same width as a frontal width of the toaster case 50. Thus, when the tray support 70 moves forward, the tray support 70 locks to a lower portion of a case front plate 51. Accordingly, when the toaster door 40 completely opens, the tray support 70 does not project out from the case front plate 5. However, a predetermined portion of each tray 74 positioned on the case front plate 51 projects out from each toaster entrance 52, 62.

A first end of the connecting lever 76 hingedly connects to the bushing 72 and a second end of the connecting lever 76 also hingedly connects to the toaster door 40. Lever slots 64, 51a are formed at the bottom of the toaster front 60 and the case front plate 51. Therefore, the connecting lever 76 connects the bushing 72 to the door 40 through the lever slots 64, 51a and moves within the lever slots 64, 51a for moving the tray support 70 according to a rotation of the toaster door 40.

Figure 4:
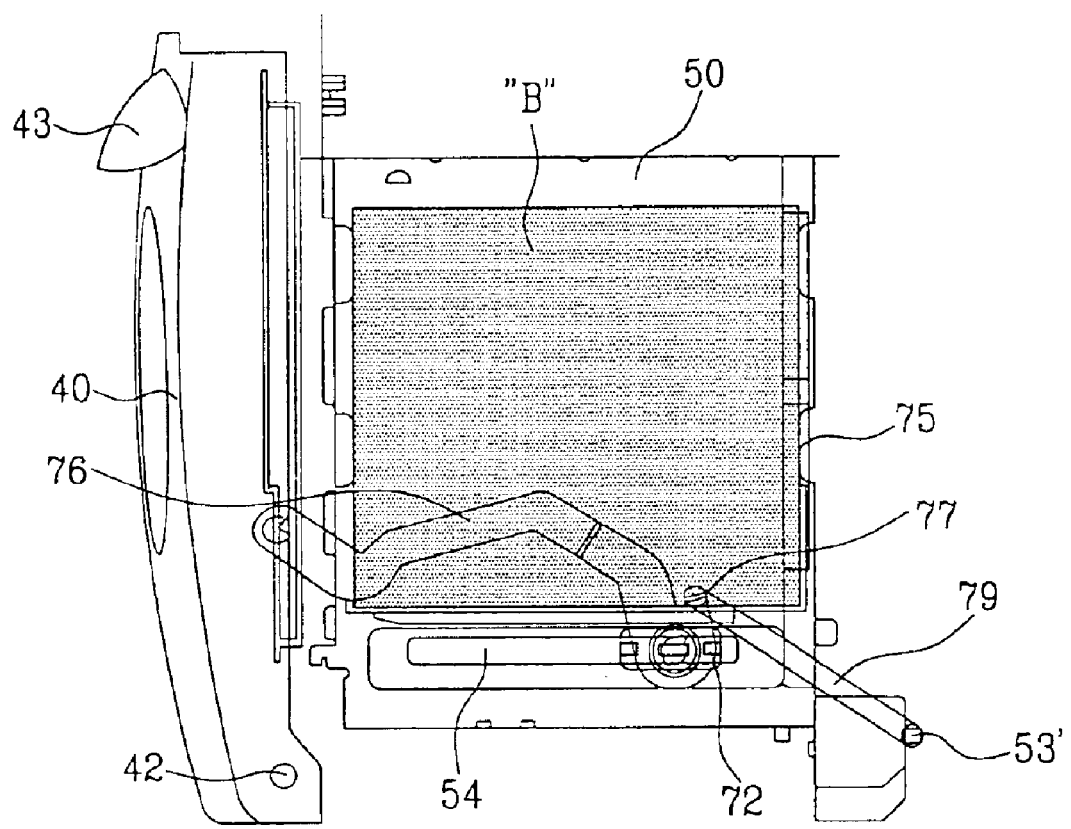
FIG. 4 illustrates an exemplary embodiment of a side view of a bread toaster when a bread slice is inside the bread toaster.
Figure 5:
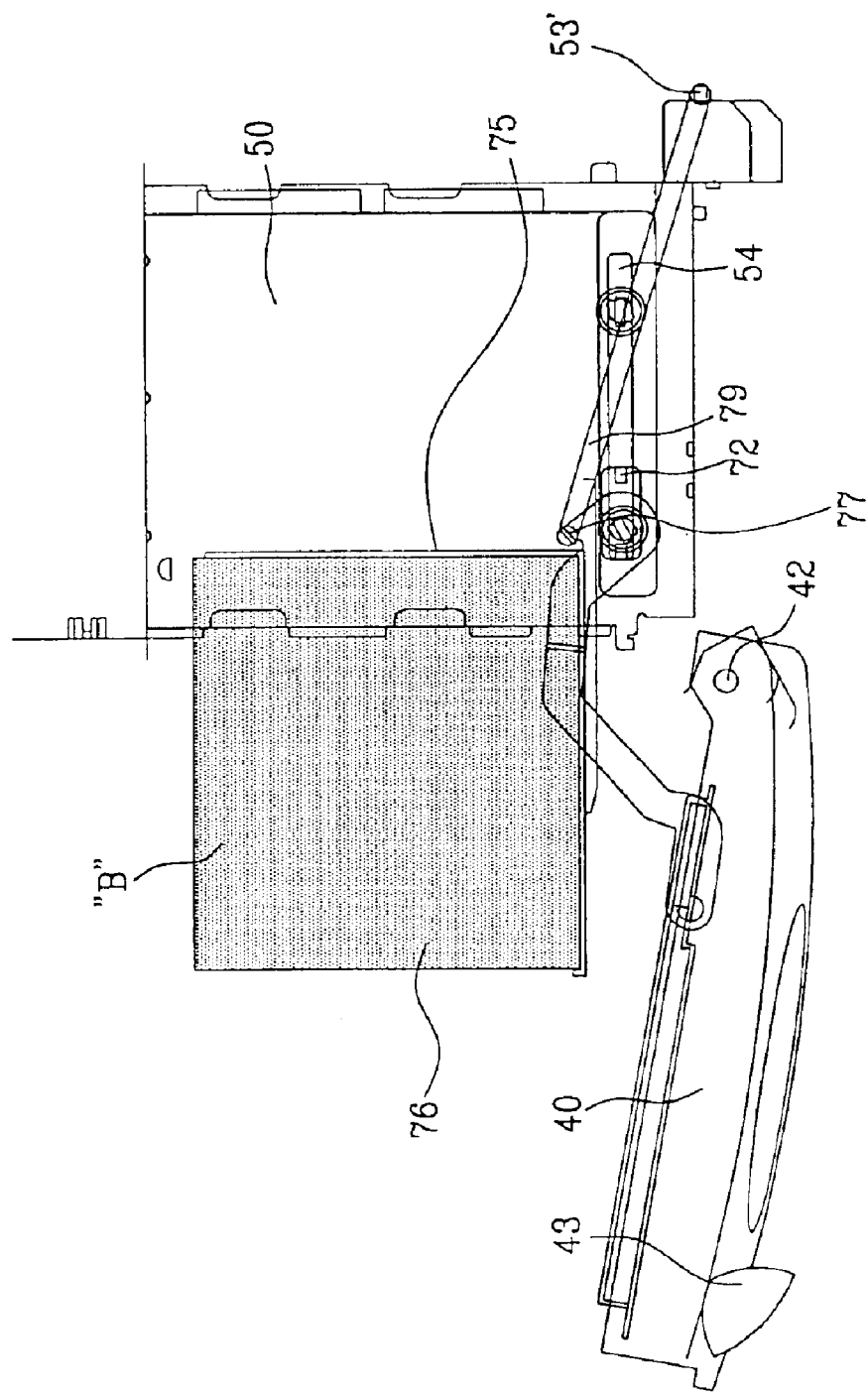
FIG. 5 is an embodiment of the present invention illustrating a side view of a bread toaster when a bread slice is out of the bread toaster.

The link mechanism further may include an elastic member 79 between the connecting lever 76 and the toaster case 50. The elastic member 79 connects an end connected to the tray support 70 of the connecting lever 76 to a rear end of the toaster body. Making reference to FIGS. 4 and 5, the elastic member 79 connects a first end of the connecting lever 76 with the rear end of the toaster case 50. As shown in FIGS. 4 and 5, a first end of the elastic member 79 connects to the first end of the connecting lever 76 which connects with the bushing 72. Additionally, a second end of the elastic member 79 connects with the rear end of the toaster case 50. More specifically, the first end of the elastic member 79 combines with a spring hook 77 formed at the first end of the connecting lever 76. The second end of the elastic member 79 combines with a spring hook 53' formed at the rear of the case rear plate 53. Accordingly, when the toaster door 40 opens, the elastic member 79 extends between the spring hooks 77, 53'. Meanwhile, when the toaster door 40 is closed, the elastic member 79 exerts a force on the first end of the connecting lever 76 which closes the toaster door 40. As such, the elastic member 79 closes the toaster door 40.

When the toaster door 40 opens or closes with the aforementioned link mechanism, the tray 74 enters into or exits from the toaster case 50. Thus, when the toaster entrances 62, 52 open or close, the bread slice enters into or exits from the toaster case 50.

An operation of the aforementioned microwave oven with the bread toaster according to the present invention will be explained as follows.

As shown in FIG. 4, the entrances 52, 62 initially close with the toaster door 40 provided at the front of the toaster panel 32.

After toasting of the bread slice, when a user pulls the door handle 43, the toaster door 40 opens. The toaster door 40 rotates about an axis formed by the hinge pins 42 and hinge holes 34 and opens as shown in FIG. 5. Simultaneously, the toaster door 40 pulls the connecting lever 76 which connects to the toaster door 40 such that the connecting lever 76 projects through the lever slots 51$a$, 64 while overcoming the elasticity of the elastic member 79.

As the connecting lever 76 moves, the bushing 72 which connects to the first end of the connecting lever 76 moves along the slot 54, thereby moving the tray support 70 toward the front end of the toaster case 50. One portion of the tray 74, positioned at the tray support 70, projects out from the entrance 62 at a predetermined distance. Therefore, a bread slice B positioned at the tray 74 exits from the toaster case 50 by rotation of the toaster door 40. Thus, the user can easily draw out the bread slice B without being burned.

As shown in FIGS. 4 and 5, the flange 75 supports the backside of the bread slice B. After completing toasting of the bread slice B, when the toaster door 40 is opened, the bread slice can be easily drawn out. For example, if the bread slice B slightly leans in the tray 74 such that the bread slice B is stuck at the case entrance 52 of the case front plate 51, the rear flange 75 pulls out the bread slice from the inside of the toaster case 50 by pushing the backside of the bread slice.

When toasting another object such as a bagel, a contact area between the bagel and the tray 74 is small such that the bagel may be come out of the tray 74 by inertia. If this occurs, even though the toaster door 40 is opened, the bagel exits from the toaster case 50 since the flange 75 pushs the bagel out. If the bagel is stuck inside of the toaster case 50, the flange 75 also pushes the backside of the bagel out.

In a microwave oven with a bread toaster according to the present invention, it is possible to toast the bread slice as well as heat an object such as food, thereby obtaining the convenience of the user.

Also, according to the present invention, the location of the electrical device chamber and the ventilating device in the upper part of the microwave oven provides vacant room for the toaster in the microwave oven. Therefore, the toaster within the microwave oven does not increase a size of the microwave oven. Furthermore, the toaster is provided in line next to the cavity, thereby improving the convenience of a user.

In a microwave oven with a bread toaster according to the present invention, a tray of the toaster enters into or exits from the inside of the toaster case when the toaster door is opened or closed. Also, a rear flange supporting a backside of a bread slice within the toaster pulls out the bread slice from an inside of the toaster case after toasting. Accordingly, the present invention allows easy withdrawal of the bread slice from the toaster case, thereby improving the user's convenience and reliability of the product.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A microwave oven with a bread toaster comprising:
   a casing;
   a cavity for cooking an object, the cavity being disposed within said casing;
   an electrical device chamber disposed within said casing, the electrical device chamber having electrical devices for heating said object within said cavity;
   a ventilating device within said casing, said ventilating device exhausting air inside said cavity to an outside of said microwave oven and cooling said electrical devices; and
   a toaster provided adjacent to said cavity within said casing, said toaster including:
   at least one tray disposed within said toaster; and
   a tray support configured to support said at least one tray, wherein a second object enters into or exits from inside said toaster along with said at least one tray by opening or closing a toaster entrance.

2. The microwave oven with the bread toaster as claimed in claim 1, wherein said electrical device chamber is provided in an upper part of said microwave oven.

3. The microwave oven with the bread toaster as claimed in claim 1, wherein said ventilating device is provided in an upper part of said microwave oven.

4. The microwave oven with the bread toaster as claimed in claim 3, said ventilating device further comprising:
   a grill having a plurality of suction holes on a front surface of said microwave oven; and
   a fan assembly connected with the outside of said microwave oven at a backside of said microwave oven, said fan assembly having a fan ventilating air inside said cavity and a motor driving said fan.

5. The microwave oven with the bread toaster as claimed in claim 1, wherein said electrical device chamber is connected with said ventilating device.

6. The microwave oven with the bread toaster as claimed in claim 1, said toaster further comprising:
   a toaster door, said toaster door closing or opening said toaster entrance in a line with a cavity door; and
   said tray connected to said toaster door by a link mechanism, said tray being moved outward or inward according to the opening or closing of said toaster door.

7. The microwave oven with the bread toaster as claimed in claim 6, wherein said toaster door rotates about an axis at a bottom of said toaster door.

8. The microwave oven with the bread toaster as claimed in claim 6, wherein said second object is a bread slice where said bread slice is vertically placed on said tray.

9. The microwave oven with the bread toaster as claimed in claim 6, wherein said tray further includes a flange provided at a rear of said tray for supporting a backside of the second object.

10. The microwave oven with the bread toaster as claimed in claim 6, wherein said link mechanism further comprises:
    said tray support having said tray at an upper part therein said tray reciprocating within a toaster body; and
    a connecting lever connecting said toaster door to said tray support.

11. The microwave oven with the bread toaster as claimed in claim 10, wherein said tray support moves along slots at sidewalls of said toaster body.

12. The microwave oven with the bread toaster as claimed in claim 11, wherein said slots are extended at the bottom of the sidewalls of said toaster body in parallel with said sidewalls.

13. The microwave oven with the bread toaster as claimed in claim 11, wherein said tray support includes a bushing fastened to both sides of said tray support and guiding a reciprocating movement when inserted to said slots.

14. The microwave oven with the bread toaster as claimed in claim 13, wherein said connecting lever includes a first end being hingedly connected with said bushing, and a second end being hingedly connected with said toaster door.

15. The microwave oven with the bread toaster as claimed in claim 10, wherein said link mechanism includes an elastic member for connecting said connecting lever to said toaster body so as to support said toaster door to be closed.

16. The microwave oven with the bread toaster as claimed in claim 15, wherein said elastic member connects one end of said connecting lever that is connected to said toaster tray with a rear end of the toaster body.

17. A microwave oven with a bread toaster comprising:
   a casing;
   a microwave cavity within said casing;
   an electrical device chamber within said casing, said electrical device chamber having electrical devices for heating an object within said microwave cavity;
   a ventilating device within said casing, said ventilating device exhausting air inside said microwave cavity to an outside of said microwave oven, and cooling said electrical devices; and
   a toaster within said casing, said toaster being adjacent to said microwave cavity, said toaster comprising:
   a toaster case within said toaster;
   a toaster front including at least one first opening and at least one second opening;
   a toaster door selectively exposing or concealing said at least one first opening;
   at least one tray, wherein said at least one tray is provided within said toaster case when said at least one first opening is concealed, and where a portion of said at least one tray projects from said toaster case through said at least one first opening when said at least one first opening is exposed; and
   a tray support configured to support said at least one tray.

18. The microwave oven with the bread toaster as claimed in claim 17, wherein said electrical device chamber is provided in an upper part of said microwave oven.

19. The microwave oven with the bread toaster as claimed in claim 17, wherein said ventilating device is provided in an upper part of said microwave oven.

20. The microwave oven with the bread toaster as claimed in claim 19, wherein said ventilating device further comprises:
   a grill having a plurality of suction holes on a front surface of said microwave oven; and
   a fan assembly connected with the outside of said microwave oven at a backside of said microwave oven, said fan assembly having a fan ventilating air inside said microwave cavity and a motor driving said fan.

21. The microwave oven with the bread toaster as claimed in claim 17, wherein said electrical device chamber is connected with said ventilating device.

22. The microwave oven with the bread toaster as claimed in claim 17, said toaster further comprising:
   a link mechanism, wherein said at least one tray and said toaster door are coupled to each other with said link mechanism.

23. The microwave oven with the bread toaster as claimed in claim 22, wherein said link mechanism further comprises:
   a connecting lever, wherein said tray support and said toaster door are coupled to each other via said connecting lever.

24. The microwave oven with the bread toaster as claimed in claim 23, said toaster case further comprising:
   at least one moving slot arranged within said toaster case, wherein said tray support is movable along said at least one moving slot.

25. The microwave oven with the bread toaster as claimed in claim 24, wherein said at least one moving slot is arranged within a bottom of said toaster case.

26. The microwave oven with the bread toaster as claimed in claim 24, wherein said at least one moving slot is parallel to said at least one tray.

27. The microwave oven with the bread toaster as claimed in claim 24, said tray support further comprising:
   a bushing coupled to said tray support, said bushing being movable within said at least one moving slot.

28. The microwave oven with the bread toaster as claimed in claim 27, wherein said connecting lever includes a first end being hingedly connected with said bushing and a second end being hingedly connected with said toaster door.

29. The microwave oven with the bread toaster as claimed in claim 28, said toaster further comprising:
   an elastic member being coupled to said connecting lever, the elastic member exerting a force on the connecting lever when said connecting lever is apart from said toaster door.

30. The microwave oven with the bread toaster as claimed in claim 29, wherein said elastic member is connected to a first end of said connecting lever.

31. The microwave oven with the bread toaster as claimed in claim 17, wherein said toaster door is rotatably connected to said toaster.

32. The microwave oven with the bread toaster as claimed in claim 31, the toaster further comprising:
   an axis being provided at a bottom portion of said toaster door.

33. The microwave oven with the bread toaster as claimed in claim 17, the at least one tray further comprising:
   a flange provided at the rear of said at least one tray.

34. A microwave oven with a bread toaster comprising:
   a casing;
   a microwave cavity within said casing;
   an electrical device chamber within said casing, said electrical device chamber having electrical devices for heating an object within said microwave cavity;
   a ventilating device within said casing, said ventilating device exhausting air inside said microwave cavity to an outside of said microwave oven and cooling said electrical devices;
   a toaster adjacent to said microwave cavity, said toaster comprising:
   a toaster case within said toaster;
   a toaster front including at least one first opening and at least one second opening, said at least one first opening being arranged at the front of said toaster case and said at least one second opening being arranged at the front of said toaster case;
   a toaster door selectively exposing or concealing said at least one first opening;
   a lever provided within said second opening;

at least one tray, wherein said at least one tray is coupled with said toaster door by said lever, and a predetermined minimum part thereof is arranged within said toaster case through said at least one first opening; and a tray support configured to support said at least one tray.

35. The microwave oven with the bread toaster as claimed in claim 34, wherein said electrical device chamber is provided in an upper part of said microwave oven.

36. The microwave oven with the bread toaster as claimed in claim 34, wherein said ventilating device is provided in an upper part of said microwave oven.

37. The microwave oven with the bread toaster as claimed in claim 36, wherein said ventilating device further comprises:

a grill having a plurality of suction holes on a front surface of said microwave oven; and a fan assembly connected with the outside of said microwave oven at a backside of said microwave oven, said fan assembly having a fan ventilating air inside said microwave cavity and a motor driving said fan.

38. The microwave oven with the bread toaster as claimed in claim 34, wherein said electrical device chamber is connected to said ventilating device.

39. The microwave oven with the bread toaster as claimed in claim 34, wherein said at least one tray is arranged within said toaster case when said at least one first opening is concealed and one part of said at least one tray projects from said toaster case through said at least one first opening when said at least one first opening is exposed.

40. The microwave oven with the bread toaster as claimed in claim 34, wherein said tray support couples with said lever.

41. The microwave oven with the bread toaster as claimed in claim 40, the toaster further comprising:

at least one moving slot being arranged within said toaster case, wherein said at least one tray may be moved along a direction of an orientation of said at least one moving slot.

42. The microwave oven with the bread toaster as claimed in claim 41, the toaster further comprising:

a case front plate arranged between said toaster case and said toaster front, said case front plate comprising at least one third opening and at least one fourth opening, wherein said at least one third opening corresponds with said at least one first opening and said at least one fourth opening corresponds with said at least one second opening.

43. The microwave oven with the bread toaster as claimed in claim 42, wherein said case front plate restricts movement of said tray support in a direction along said orientation of said at least one moving slot.

44. The microwave oven with the bread toaster as claimed in claim 41, wherein said at least one moving slot is arranged within a bottom portion of said toaster case.

45. The microwave oven with the bread toaster as claimed in claim 41, wherein said at least one moving slot is oriented parallel to said at least one tray.

46. The microwave oven with the bread toaster as claimed in claim 41, said tray support further comprising:

a bushing coupled to said tray support, said bushing being movable within said at least one moving slot.

47. The microwave oven with the bread toaster as claimed in claim 46, wherein said lever comprises a first end and a second end, wherein said bushing is rotatably coupled to said first end and said toaster door is rotatably coupled to said second end.

48. The microwave oven with the bread toaster as claimed in claim 34, said toaster further comprising:

a rear case plate arranged at a rear portion of said toaster case.

49. The microwave oven with the bread toaster as claimed in claim 48, said toaster further comprising:

an elastic member, said elastic member elastically coupling said lever to said rear case plate.

50. A microwave oven, the microwave oven comprising:

a casing;

a cavity for heating objects disposed within the casing;

an electrical device chamber within the casing, the electrical device chamber having microwave generating devices disposed therein;

a ventilating device adjacent the cavity, the ventilating device exhausting air from an inside of the cavity to an outside of the microwave oven and cooling the microwave generating devices; and a toaster for toasting an object, the toaster being disposed within the cavity, the toaster comprising:

a toaster door;

a tray, the tray being operatively connected with the toaster door; and a tray supporter for supporting said tray.

51. A microwave oven as recited in claim 50, wherein the electrical device chamber connects with the ventilating device.

52. A microwave oven as recited in claim 51, the ventilating device further comprising:

a grill having a plurality of suction holes on a front surface of the microwave oven; and a fan assembly connected with the outside of the microwave oven at a backside of the microwave oven, the fan assembly having a fan ventilating air inside the cavity and a motor driving the fan.

53. A microwave oven as recited in claim 50, wherein the toaster door is in line with the cavity.

54. A microwave oven as recited in claim 50, the toaster further comprising:

a toaster case having moving slots disposed on sides of the toaster case.

55. A microwave oven as recited in claim 54, wherein the tray support further comprises an upper surface where the tray fastens with the tray support at the tray upper surface; and bushings disposed on sides of the tray support, the bushings having a same width and a same length as the toaster case moving slots, the bushings providing connective operation between the toaster casing moving slots and the tray support wherein the tray support moves along the toaster case moving slots where the same width and the same length of the bushings minimize rotation of the bushings in the toaster case moving slots.

56. A microwave oven as recited in claim 55, wherein a link mechanism operatively connects the tray with the toaster door such that the tray moves with the toaster door when the toaster door moves to either an open position or a closed position.

57. A microwave oven as recited in claim 56, the link mechanism further comprising:

a connecting lever, the connecting lever having a first end and a second end where the connecting lever first end connects with the toaster door and the connecting lever second end connects with one of the bushings and the tray support.

58. A microwave oven as recited in claim 57, the link mechanism further comprising:

an elastic member, the elastic member having a first end and a second end, the elastic member first end connecting with the connecting lever second end and the elastic member second end connecting with a rear end of the toaster body such that the elastic member maintains the toaster door in the closed position.

59. A microwave oven as recited in claim 58, wherein a portion of the tray projects from the toaster to the outside of the microwave oven when the toaster door is in the open position.

60. A microwave oven as recited in claim 59, the tray further comprising:

a support flange at a rear end of the tray, the support flange supporting a backside of the object, such as a slice of bread, when the portion of the tray moves to the outside of the microwave oven when the toaster door moves to the open position.

61. A microwave oven as recited in claim 50, wherein the toaster door rotates about a bottom of the toaster door.

62. A microwave oven, the microwave oven comprising:

a casing;

a cavity for heating objects disposed within the casing;

an electrical device chamber within the casing, the electrical device chamber having microwave generating devices disposed therein;

a ventilating device adjacent the cavity, the ventilating device exhausting air from an inside of the cavity to an outside of the microwave oven and cooling the microwave generating devices; and a toaster for toasting an object, the toaster being disposed within the cavity, the toaster comprising:

a toaster case;

a toaster door on a front surface of the toaster case, the toaster door being in line with the cavity, the toaster door moving between an open position and a closed position;

a tray, the tray moving with the toaster door as the toaster door moves between the open position and the closed position;

a tray support configured to support the tray;

a link mechanism, the link mechanism providing connectivity between the toaster door and the tray such that the tray moves with the toaster door as the toaster door moves between the open position and the closed position;

an elastic member, the elastic member having a first end and a second end, the elastic member first end being in communication with the link mechanism and the elastic member second end being connected to a rear end of the toaster case wherein the elastic member maintains the toaster door in the closed position.

63. A microwave oven as recited in claim 62, the toaster case further comprising:

moving slots disposed on sides of the toaster case.

64. A microwave oven as recited in claim 63, wherein the tray support further comprises an upper surface where the tray fastens with the tray support at the tray support upper surface; and bushings, the bushings being on sides of the tray support, the bushings providing connective operation between the toaster case moving slots and the tray support wherein the tray support moves along the toaster case moving slots.

65. A microwave oven as recited in claim 64, the link mechanism further comprising:

a connecting lever, the connecting lever having a first end and a second end, the connecting lever first end connecting with the toaster door and the connecting lever second end connecting with one of the bushings such that as the toaster door moves between the open position and the closed position, the connecting lever moves the one of the bushings and the tray support between the open position and the closed position.

66. A microwave oven as recited in claim 62, wherein the toaster door rotates about a bottom of the toaster door.

67. A microwave oven as recited in claim 62, the tray further comprising:

a support flange at a rear end of the tray, the support flange supporting a backside of the object, such as a slice of bread, when the portion of the tray moves to the outside of the microwave oven when the toaster door moves to the open position.

68. A microwave oven as recited in claim 62, wherein a portion of the tray projects from the roaster to the outside of the microwave oven when the toaster door is in the open position.

* * * * *